United States Patent [19]

Butler et al.

[11] Patent Number: 4,912,662
[45] Date of Patent: Mar. 27, 1990

[54] INCLINOMETER

[75] Inventors: Andrew G. Butler, Palo Alto; Donald G. Green, Sunnyvale; Robert E. Nagle, Palo Alto, all of Calif.

[73] Assignee: Wedge Innovations, Inc., Sunnyvale, Calif.

[21] Appl. No.: 65,286

[22] Filed: Jun. 22, 1987

[51] Int. Cl.⁴ .................... G01C 7/30; H01G 5/20; G06F 15/20
[52] U.S. Cl. ..................... 364/559; 33/346; 33/377; 324/663; 361/278; 361/292; 364/571.05
[58] Field of Search .............. 364/550, 556, 570, 571, 364/559; 73/1 E, 517 R, 189; 33/366, 377, 346; 340/870.37, 870.32, 870.23, 689; 324/61 R

[56] References Cited
U.S. PATENT DOCUMENTS

| | | | |
|---|---|---|---|
| 2,592,941 | 4/1952 | Moore | 33/366 |
| 3,009,255 | 11/1961 | Robillard | 33/366 |
| 3,059,343 | 10/1962 | Kermode | 33/366 |
| 3,286,357 | 11/1966 | Grumman | 33/366 |
| 3,421,227 | 1/1969 | Turner et al. | 33/366 |
| 3,486,238 | 12/1969 | Hansen | 33/366 |
| 3,496,565 | 2/1970 | Jenkins | 364/559 |
| 3,576,124 | 4/1971 | O'Connor | 73/178 R |
| 3,633,003 | 1/1972 | Talwani | 364/559 |
| 3,823,486 | 7/1974 | Bhat et al. | 33/366 |
| 3,906,471 | 9/1975 | Shawhan | 33/366 |
| 3,911,592 | 10/1975 | Crask | 33/378 |
| 4,022,284 | 5/1977 | Crow | 33/366 |
| 4,028,815 | 6/1977 | Buckley et al. | 33/366 |
| 4,094,073 | 6/1978 | Parra | 33/366 |
| 4,167,818 | 9/1979 | Cantarella et al. | 33/366 |
| 4,528,760 | 7/1985 | Plummer | 33/366 |
| 4,549,277 | 10/1985 | Brunson et al. | 364/559 |
| 4,551,921 | 11/1985 | Puyo et al. | 33/366 |
| 4,644,662 | 2/1987 | Anderson et al. | 33/366 |
| 4,660,290 | 4/1987 | Hori et al. | 33/366 |
| 4,676,103 | 6/1987 | Nakajima | 33/366 |
| 4,707,929 | 11/1987 | Hiyama | 33/366 |

OTHER PUBLICATIONS

Barker et al., "Intelligent Inclinometer", Apr. 1980, pp. 1-4.

Primary Examiner—Felix D. Gruber
Attorney, Agent, or Firm—Fliesler, Dubb, Meyer & Lovejoy

[57] ABSTRACT

An inclinometer 20 has a sensing unit 40 for providing a varying capacitance signal depending on the orientation of the inclinometer 20. An oscillator circuit unit 82 includes the sensor unit 40 as a capacitive element for providing a signal having a period and a frequency depending on the capacitance of the sensor unit 40. A unit 92 is provided for determining the period of the signal. A look-up table unit 96 stores a predetermined relationship between the period of the signal and the angle of orientation of the inclinometer 20. A comparison unit 94 then compares the period of the signal to the period stored in the look-up table unit 96 and selects the corresponding angle which is the angle of orientation of the inclinometer 20. The angle is then displayed on the inclinometer display 25.

48 Claims, 12 Drawing Sheets

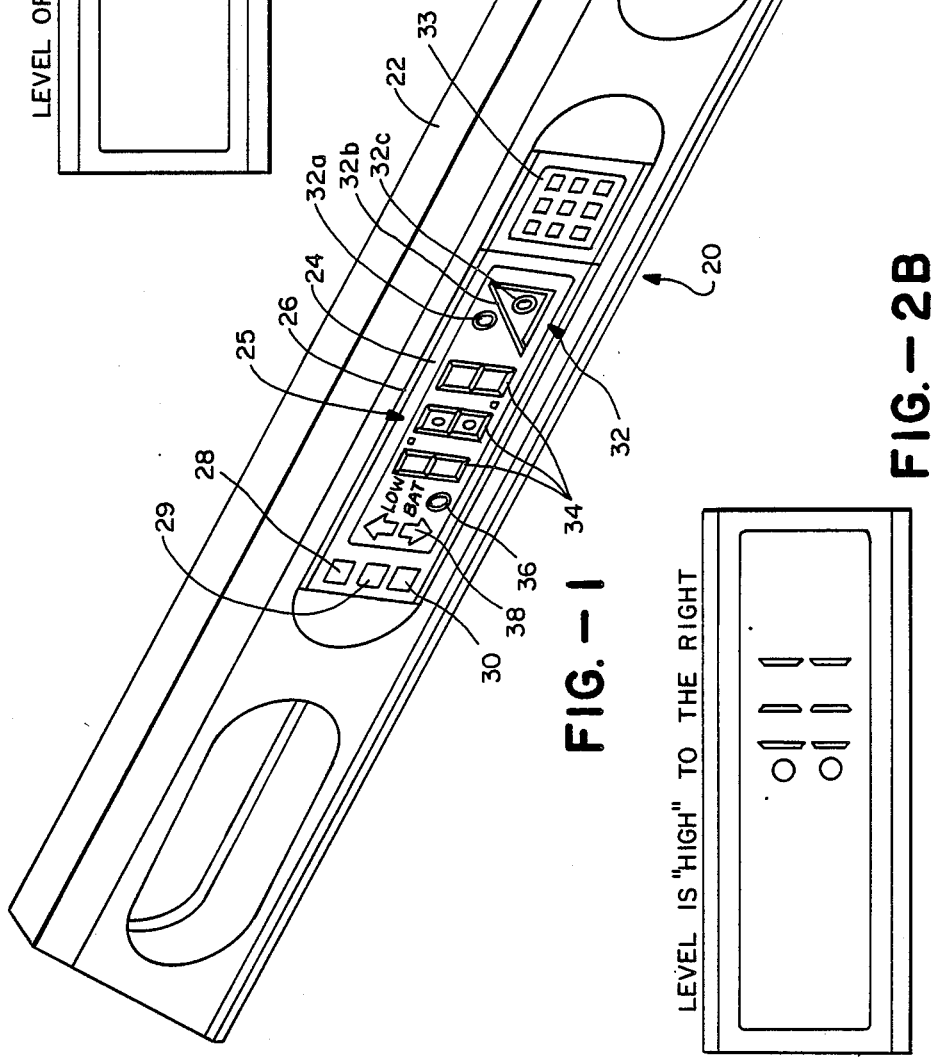

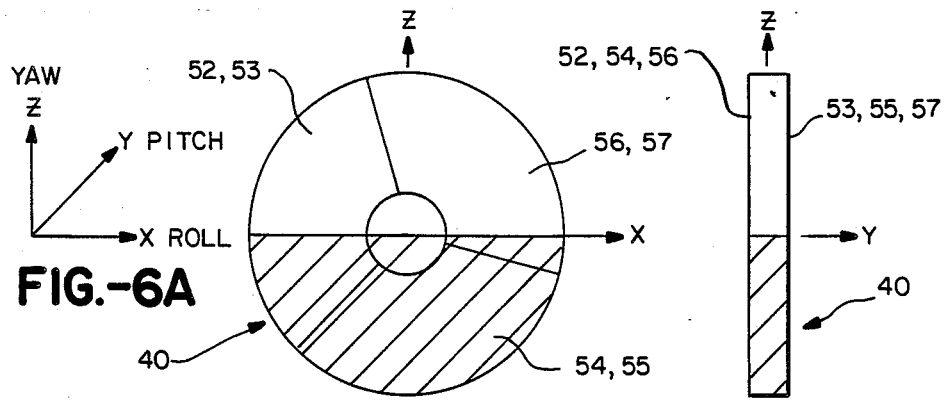
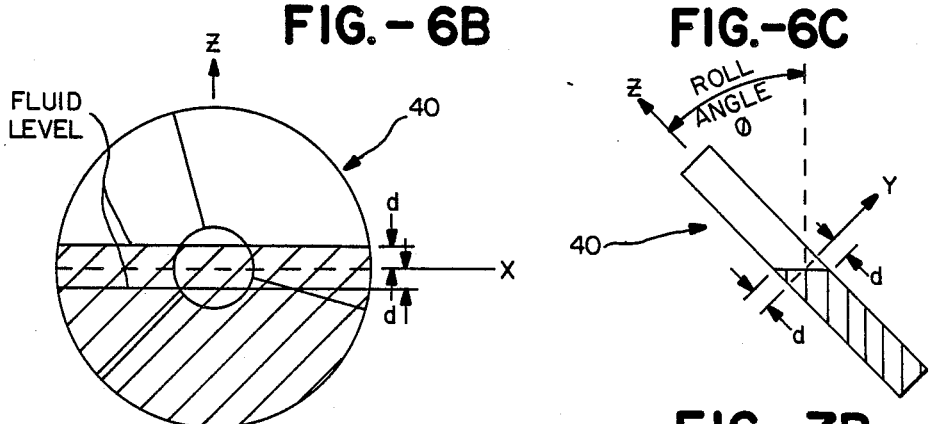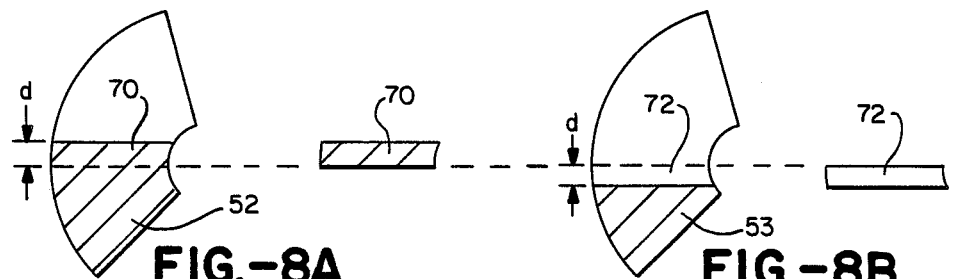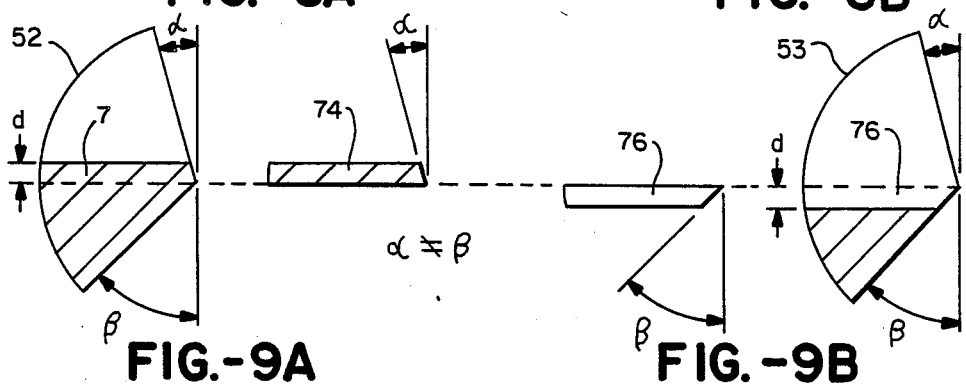

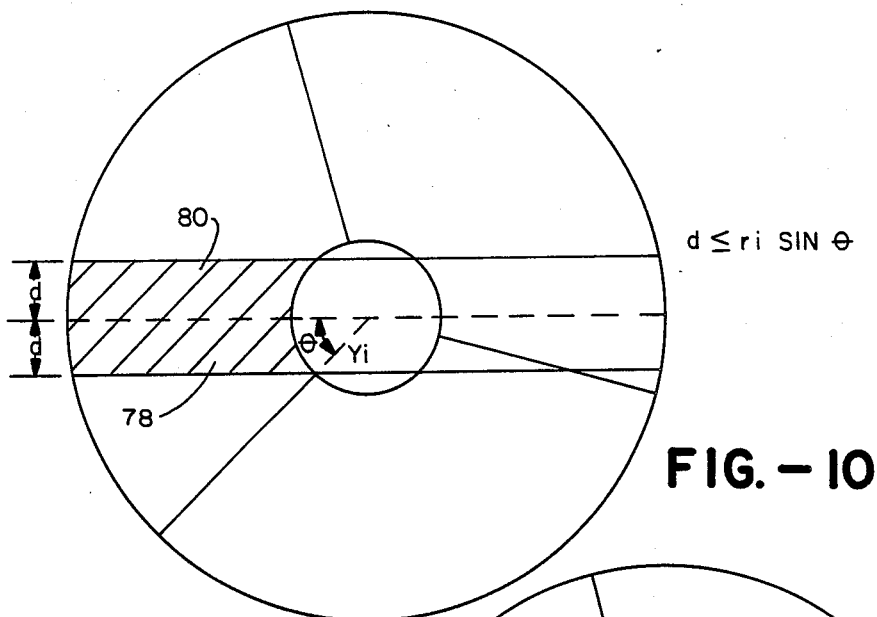
FIG.—10A
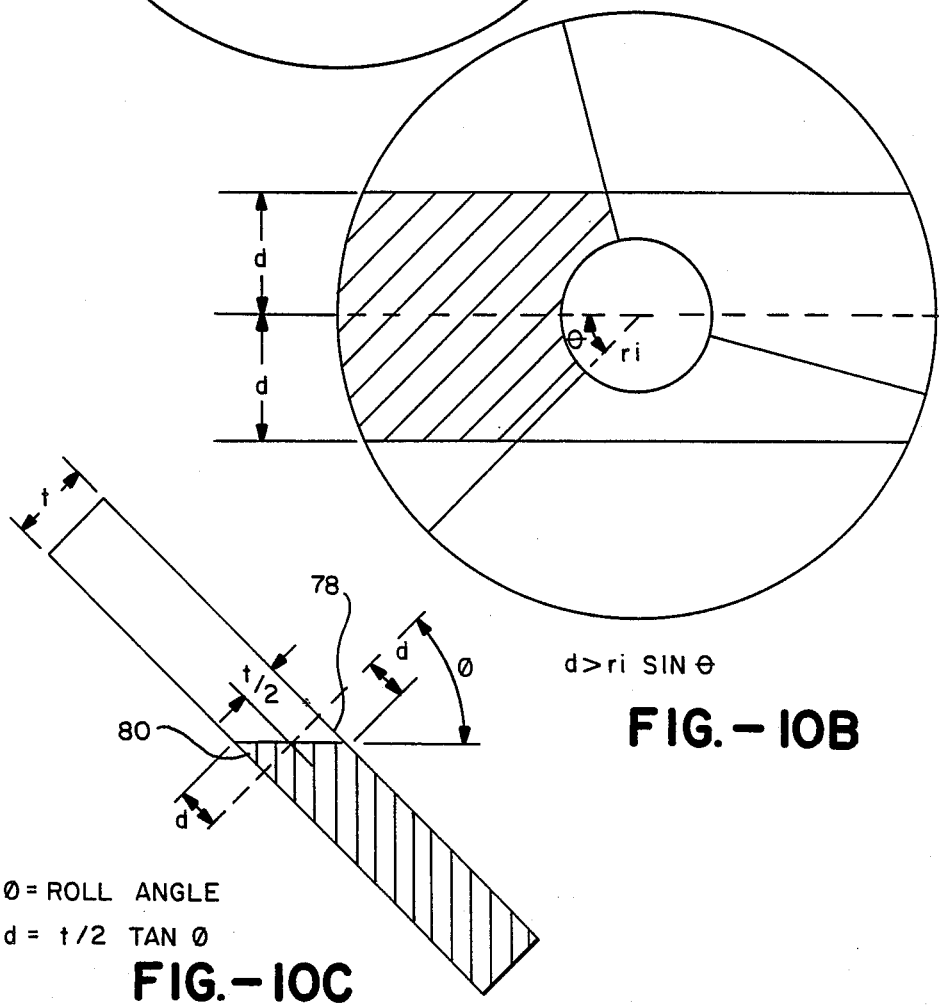
FIG.—10B
∅ = ROLL ANGLE
d = t/2 TAN ∅
FIG.—10C

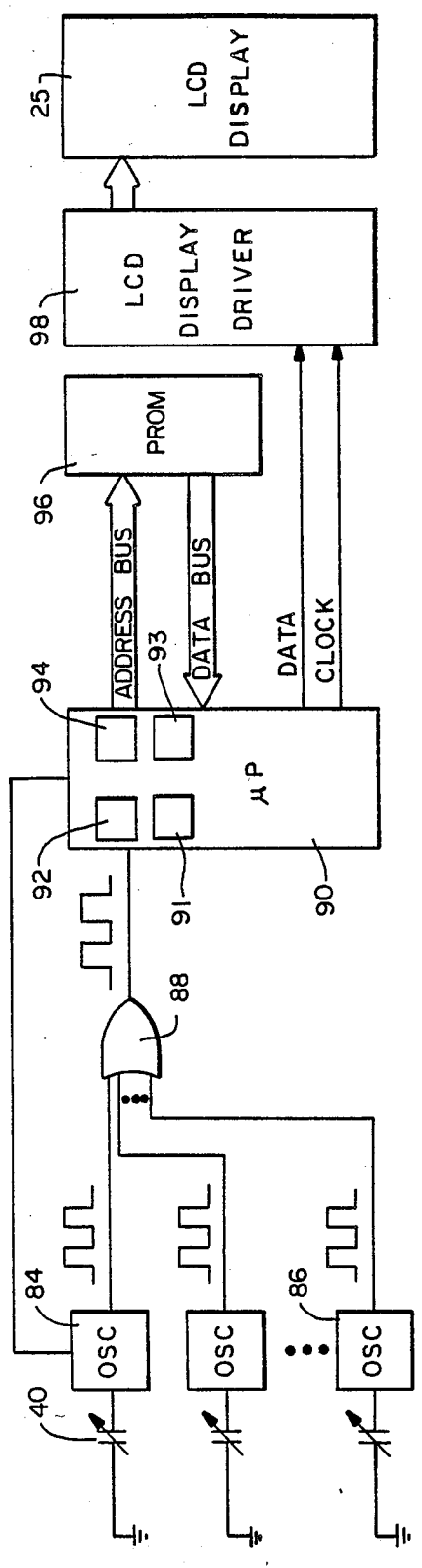
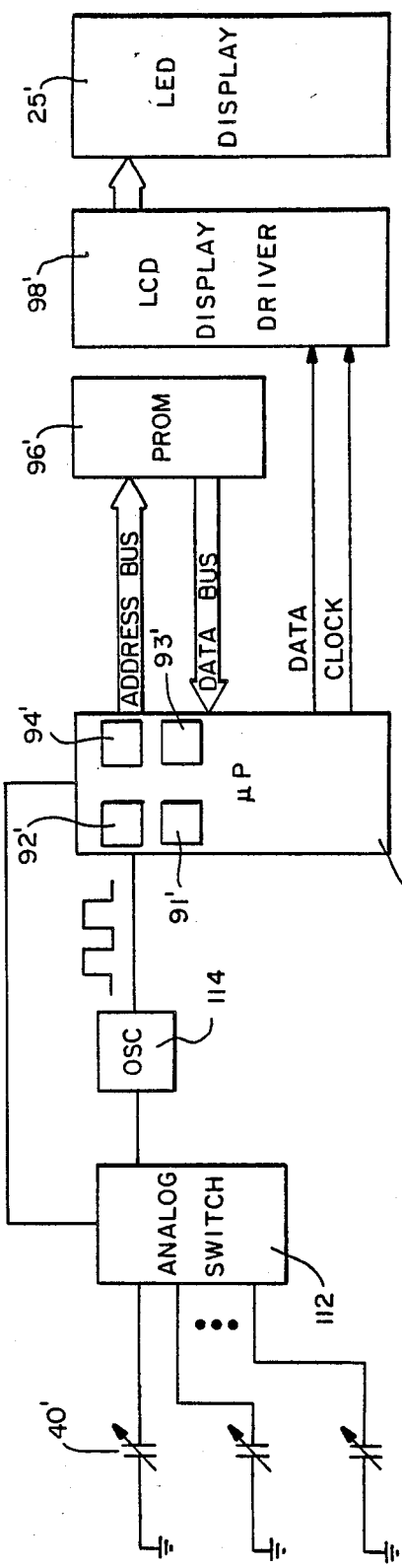

INCLINOMETER

FIELD OF THE INVENTION

The present invention relates to an inclinometer or level and, in particular, to an inclinometer or level with electronic sensing and readout capabilities.

BACKGROUND OF THE INVENTION

Currently there are a number of electronic inclinometer and level devices disclosed in the prior art. The simpler of these devices in general attempt to apply an electrical circuit to a known device, such as a bubble level, and therefrom directly provide a readout of the orientation of the level. Complicated inclinometers tend to take the same approach but are more bulky and cumbersome to use. In general these prior art inclinometers are difficult to manufacture due to alignment constraints and tolerances required to accurately position the sensing device into the housing. Errors in the manufacture of the sensing device and in the mounting of the sensing device in the housing can only be reminded through a practice of discarding faulty sensors and/or manufacturing the entire inclinometer with very exciting and costly procedures. Further, should the inclinometer not be rugged enough, ordinary field use would require that the inclinometer either be discarded when it provides inaccurate readings or sent back to the manufacturer for recalibration.

In addition, the prior art devices provide no compensation nor indication that the device while properly positioned on one plane, for example the pitch plane, could for example have too much of an angle in a perpendicular plane such as the roll plane so as to provide an inaccurate pitch reading. Also the effects of temperature on inclinometers are not accounted for.

Finally, most inclinometers provide for only one or two readout formats requiring additional use of tables and the like for translation into other desired readings.

SUMMARY OF THE INVENTION

The present invention is directed to overcome the disadvantages of the prior art.

The present inclinometer of the invention is comprised of a sensor for providing at least a varying capacitance depending on the orientation of the inclinometer. The inclinometer further includes an oscillator circuit which includes the sensor as a capacitor element for providing a signal or a plurality of signals, each having a period and a frequency depending on the capacitance of the sensor. The inclinometer further includes a device for determining the period of each signal. A look-up table is provided for storing a relationship between the period of each signal and an angle of orientation of the inclinometer. A comparing unit is provided for comparing the period of the signal to a period stored in the look-up table which has a relationship to the angle being measured. Further, a display device is provided for giving selectable digital and analog readouts. The digital readouts can include by way of example angle, rise/run, and percent slope mode readouts.

The sensor for determining the orientation of the inclinometer includes a first plate having a plurality of isolated conducting first sectors which are clustered about an isolated conducting first central hub. The sensor further includes a second plate having a plurality of isolated conducting second sectors which are clustered about an isolated conducting second central hub. The first plate is positioned substantially parallel to the second plate with the sectors and the hubs aligned. A peripheral edge surrounds the aligned first and second plates to form a cavity there between. A fluid partially fills the cavity such that a change in orientation of the inclinometer causes the fluid to shift relative to the sectors and the hubs. Alternatively, the plates and sectors can be misaligned or the plates can be provided in a non-parallel or wedge shaped configuration and fall within the scope of the invention.

In an aspect of the invention, the sensor has three first sectors aligned with three second sectors to form sector pairs, each of which pair is a variable capacitor. The inclinometer provides for determining the period of a signal from each of these sector pairs, at least one of the highest and the lowest capacitance values of the sector pairs is for determining the general orientation of the inclinometer with the pair of sectors having a middle capacitance value being used for determining the exact angle. In the several cases where values of the signal pairs cross over each other, as where the highest and middle capacitance values and/or the lowest and middle capacitance are equivalent, either can be used.

In another aspect of the invention, the pair of hubs is provided as a passive element of an oscillator circuit for determining the roll orientation of the inclinometer and warning when there is excessive roll so as to indicate an inaccurate reading. The hubs also eliminate inaccuracies due to roll in an appropriate range before the warning of an inaccurate reading is provided by the inclinometer. It is to be understood that absent the hubs, the capacitance values associated with each sector or plate due to the amount of surface covered by the fluid can also be used to provide a warning and correction for excessive roll and/or yaw.

In another aspect of the invention the display can be a digital display including readouts of angle, slope, or rise to run, as well as an analog display which indicates to which side of level or plumb the inclinometer is positioned.

In another aspect of the invention, the inclinometer includes a field recalibration unit. Should the sensor shift its position relative to the rest of the electrical components or should the entire electrical package shift its position relative to the housing, the recalibration unit can be used to correct the readings accordingly. Further, as the invention provides for the electrical unit to be inserted into one of various housings, each of which has a different length, the inclinometer would be calibrated after insertion into the appropriate length of housing in order to remove any errors due to that mounting.

In yet another aspect of the invention, the inclinometer includes a temperature compensation unit.

In still a further aspect of the invention, the look-up table is provided in permanent semiconductor memory in the inclinometer and is customized in manufacture to the specific sensor used in the inclinometer. Thus, any errors in the manufacture of the sensor or the mounting of the sensor or the manufacture of the inclinometer, generally, are automatically compensated for in an efficient and convenient manner without the expense of exact alignment and discarded unusable parts.

BRIEF DESCRIPTION OF THE FIGURES

FIG. 1 is a perspective view of an embodiment of the inclinometer of the invention.

FIG. 2A through 2C are front views of the analog display of the inclinometer of the invention.

FIGS. 6A through 6C, 7A and 7B, 8A and 8B, 9A and 9B and 10A through 10C shows representation of the sensor in various orientations.

FIG. 11 depicts a representative schematic of a preferred embodiment of the electrical circuitry of the inclinometer.

FIG. 12 depicts another preferred embodiment of the circuitry of the inclinometer of the invention.

DETAILED DESCRIPTION OF THE PREFERRED EMBODIMENTS

Figure 2C:
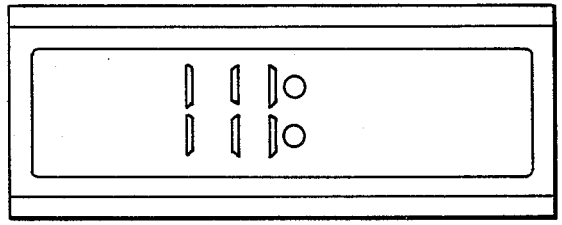

With respect to the FIGS., and in particular to FIG. 1, a preferred embodiment of the inclinometer is depicted and identified by the number 20. The inclinometer 20 includes one of a number of different lengthed rails such as rail 22 into which is removably inserted an electronic measurement unit 24 which has an outer housing 26. The face of the electronic measuring unit 24 includes a mode selector 28, a recalibration selector 29, and an accuracy range selector 30. The face further includes a combination degree, percentage and rise/run indicator 32, three seven element alphanumeric indicators 34, a low battery indicator 36 and direction indicator 38 which indicates which direction the inclinometer 20 should be moved in order to obtain a level or plumb reading. As will be more fully discussed herein below, the mode selector 28 allows the selection of the display modes which can selectively provide digital displays such as the angle, the rise/run, the percent slope, and also an analog display. The analog display as shown in FIGS. 2A through 2C includes a level indicator as shown in FIG. 2A which comprises two dots. In 2B, the indicator includes three vertical lines located to the right of the dot indicating the right side is high. FIG. 2C indicates that the left side is high. The degree that either side is high is indicated by the number of lines to the right or left of the two dots. Thus, three lines to the right of the two dots indicates that the level is higher to the right side than the level would be if only one line were displayed.

Figure 3:
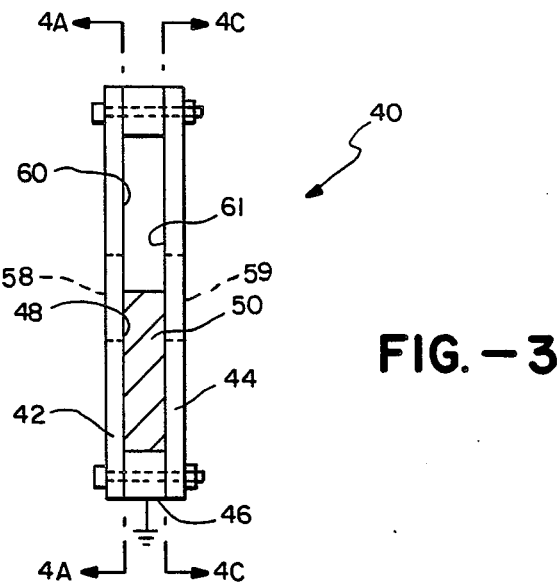
FIG. 3 is a sectional view of the sensor of the inclinometer of the invention.
Figure 4A:
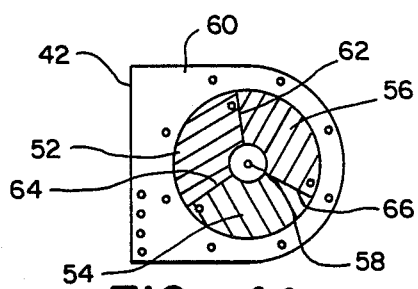
FIG. 4A through 4D are front and back views of sensor plates of an embodiment of the invention.

The inclinometer 20 includes a sensor unit 40 (sensor means) (FIG. 3) which senses the inclination of the inclinometer 20 through a full 360 degrees. The sensor 40 consists of two plates 42, 44 which, in a preferred embodiment, are mirror images of each other. The sensor further includes a peripheral edge 46 (conducting means) which hold the plates in a spaced parallel relationship to each other and which defines an internal cavity 48. The peripheral edge 46 is conductive and grounded (FIG. 3). Inside and partially filling the cavity is a fluid 50. In a preferred embodiment the plates 42, 44, are divided into three conductive but electrically isolated sectors, or triads, such as wedge shaped sectors 52, 54 and 56 (FIG. 4A). These sectors describe an outer circle and are clustered about a central isolated and conducting hub 58. In a preferred embodiment, the sensor plate and the sectors 52, 54 and 56, and hub 58 are coated with a thin layer 60 of a dielectric material such as, for example, Teflon ® and the fluid 50 is conductive.

Plate 44 also has three isolated and electrically conducting sectors 53, 55, and 57 and an isolated and electrically conducting hub 59 coated with a thin layer 61 of dielectric material. Sectors 52, 54 and 56 and hub 58 are parallel to and aligned with sector 53, 55 and 57 and hub 59 respectively to form variable capacitors between each sector or hub and the electrically grounded fluid 50.

It is to be understood that hubs 58, 59 can be eliminated from sensor 40 and still have sensor 70 fall within the scope of the invention. However, for sensor 40 to have the advantageous insensitivity to roll, as discussed below, the sectors would be similarly shaped with a semicircle defining the inner border of each sector.

It is also to be understood that roll and yaw compensation can be accomplished with sectors without semicircular inner borders by accounting for the capcitance between each sector and edge 46 individually.

Figure 4B:
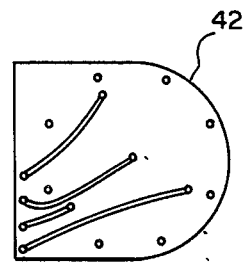
Figure 4C:
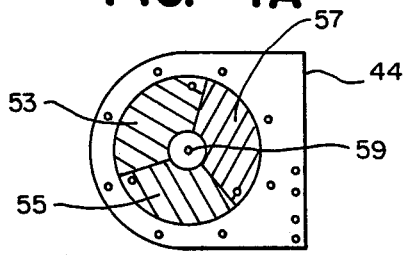
Figure 4D:
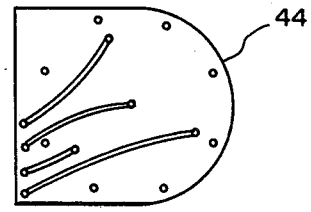

As can be seen in FIG. 4B appropriate leads (connecting means) are directed from the back of the plate 42. In the preferred embodiment, the conductive fluid 50 fills half of the cavity so that fifty percent of the area is covered with conductive fluid at any one time. The conductive fluid and the peripheral edge 46 are appropriately grounded. The plates 42, 44 are constructed, in a preferred embodiment, of fiberglass reinforce circuit board material with the edge 46 being made of aluminum. The fluids in a perffered embodiment is a combination of an alkane and a ketone.

It is to be understood that the sensor 40 can also be constructed by having the cavity 48 filled with a dielectric fluid and removing the dielectric layer from plates. The advantage of the initial design using a conductive fluid is that the conductive fluid, in effect, reduces the distance between the pairs of capacitive plates to the thickness of the teflon layer 60, 61 thus allowing a high capacitance sensor 40 to be constructed without the manufacturing problems of placing the plates 42, 44 close to each other.

With the above arrangement, as the sensor unit 40 is moved through rotation, the amount of surface area of the fluid which comes in proximity to the various pairs of sectors varies making the sectors variable capacitors. Thus the sensor unit 40 allows for an economical, continuous, sensor output through 360 degrees of rotation.

Figure 5:
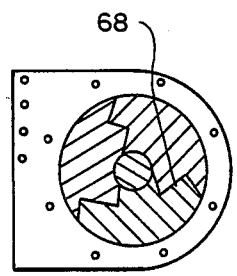
FIG. 5 is a side view of an alternate embodiment of a sensor plate of the invention.

To achieve continuous sensor output at all angles of inclination, the sensor design requires that the fluid intersect no more than one sensor plate separation line, such as line 62, 64, and 66 (FIG. 4A) at any given angle of orientation of the inclinometer. Accordingly, it is highly advantageous that only an odd number of sectors be included in the design of the sensor unit 40. Alternatively, the sectors can have nonlinear plate separations as is shown at 68 in FIG. 5. Further there is a high degree of resolution since the electrical circuitry described below allows for the selection of the one pair of adjacent sectors for measuring the capacitance and determining angle which always has a capacitance reading which is not less than 25 percent of the total capacitance of the given pair of sectors.

The pairs of hubs 58, 59 define a donut configuration for sensors 40, and serve two functions. First, hubs 58, 59 serve to reduce the sentivity of the sensor unit 40 to roll and yaw. Second, the hubs and associated circuitry including portions of microprocessor 90, (indicating means) cause the display to blink (or by way of example to alternate between the display of FIG. 2B and FIG. 2C) if there is any unaccepted error due to roll or yaw. As seen in FIG. 6A, inclination is measured about the "Y" axis and is described in terms of pitch. Roll and yaw, if not accounted for, tend to add inaccuracies to the sensor as described below. By using the hubs the sensors are made less sensitive to roll and yaw, and in particular when the inclinometer is horizontal or vertical. Further, the hubs, when connected to an oscillator circuit as described below, can be used to give an indication that roll and/or yaw is outside of acceptable ranges for accurate readings. The capacitance difference between the first hub and the second hub indicates the roll or yaw is unacceptable. In FIG. 6B, the sensor 40 is oriented at a pitch angle of zero degrees. It is clear from FIGS. 6A, 6B and 6C, that when there is not pitch or roll, that the yaw (rotation about the z axis) will not change the state of the sensor. That is to say that each sector will experience the identical wetted area regardless of yaw. Thus, at zero degrees pitch and roll, the sensor is insensitive to yaw. However, roll does affect the sensor's state at zero degree pitch and yaw. FIG. 7B depicts a sensor 40 with a non-zero degree roll angle. As will be discussed herein below, the electronic measuring unit 24 would choose to use the pair of sectors 52, 53 (FIG. 6B) for the angle calculation as this pair would give the most accurate value as more surface is wetter in comparison to sections 56, 57, and saturation has not occurred as in Sectors 54, 55.

In FIG. 8A, 8B it is equivalent that the wetted area on each of the two sectors 52, 53 is changed due to the roll. However, due to the hub area which does not contribute to the capacitance measured between the sector 52 and ground, and between the sector 53 and ground, the sum of the two areas of the sectors 52, 53 remains constant. The gain of area 70 by sector 52 is exactly cancelled by the loss of area 72 by sector 53. Thus, using this geometry at roll and pitch of near 0 degrees, the sensor unit 40 is essentially insensitive to roll.

In FIGS. 9A and 9B the advantage of the hubs 58, 59 is graphically demonstrated. In these FIGS., with no hub section remove, the gain in the wetted area of sector 52, which is area 74 is greater than the loss in the wetted area by sector 53, which is area 76. Thus, the sum of the two wetted areas would not in general be a constant.

An analogues analysis can be done for yaw with the sensor oriented vertically (pitch equal to 90 degrees or 270 degrees) with the similar conclusions regarding yaw insensitivity. Thus it can be understood that there is great advantage to having the variable capacitance part of the sensor resemble a donut defined by an inner and an outer concentric circle.

The radius of the hubs 58, 59, or the inner concentric circle of the sectors, determines how much roll, and also yaw, the sensors can tolerate around zero, ninety, one hundred and eighty, and two hundred and seventy degree pitches without any error. In FIG. 10A, the sensor unit 40 has zero degrees pitch and has rolled sufficiently to cause the liquid surface to be a distance of plus or minus d from the center line. If the distance d is less than or equal to rsin(theta) where r is the radius of the hub and theta is the angle between the fluid line at zero degrees roll, zero degrees yaw, and the closet sector separation line, the loss in wetted area 78 equals the gain of area 80. Thus as demonstrated before, the total capacitance of the pair of sectors is unchanged. In FIG. 10B, the distance d is greater than rsin(theta), hence the wetted areas are unequal and error would result in the sensed angle. Thus outside a range of values as defined by the above geometry of the sensor 40, sensor 40 is no longer insensitive to roll or yaw. The relationship between d and the roll angle, phi, is a function of the thickness t of the sensor as demonstrated in FIG. 10A, 10B and 10C. Thus, to tolerate a roll angle of phi at zero degrees pitch, it is required that:

$$d = (t/2)\tan(\text{phi}) < r\sin(\text{theta})$$

where r, theta and t are properties determined during sensor construction. By setting theta equal to 45 degrees, the sensor has an equivalent insensitivity to yaw at 90 degrees pitch as it does to roll at 0 degrees pitch. Therefore, t and r can be varied to satisfy the above equation for any reasonable roll or yaw angle. The inclinometer 20 becomes less sensitive to roll and yaw with a decreased t (thickness) value and an increased $r_i$ (radius) value. However, as $r_i$ becomes larger, the maximum capacitive value becomes smaller and the resolution of the inclinometer is reduced.

Each of the variable capacitors formed between the sectors and hubs and the electrically grounded peripheral edge 46, form passive capacitive elements in an oscillator circuit such as the oscillator circuitry 82 (circuit means) in FIG. 11. Circuitry 82 in one of the preferred embodiments includes first oscillator 84 which is connected to the variable capacitance defined by sector 52 with the other oscillators so communicating with the other sectors and with the final two oscillators, connected to the hub. The output of each of these oscillators are periodic waves such as square which are sequentially communicated by OR gate 88 to a microprocessor 90. The frequency and period of the oscillator circuit is thus related to the area that a given sector has in contact with a fluid and thus the angle of inclination or pitch of the inclinometer. The period is determined by timing a fixed number of pulses from the given oscillator. In the microprocessor 90 there is a unit 92 determining means for determining the period and/or frequency of the signals coming from the oscillator circuitry 82 and a unit 94 (comparing means) for comparing the determined period with a look-up table contained in PROM 96. During manufacture, each of the sensor units 40 is calibrated and the calibration is stored in the PROM 96 (look-up table means) which is part of the electrical measuring unit 24. Thus, any irregularities in the sensor can be accounted for so that the sensor irregularities do not cause errors in the readings which are taken with the inclinometer 20. The PROM 96 stores a look-up table which relates the period of a signal to the pitch angle in degrees. Of course it is understood that other mathematical relationships can be stored so that the appropriate display is created such as the slope, rise to run or analog displays. The microprocessor then drives a display driver 98 which in turn drives the display 25.

As indicated above, having the individual period versus angle relationship stored in the PROM 96 for each sensor allows the sensors to vary due to manufacturing tolerances and still have the readings accurate as the irregularities of each sensor are compensated for by the stored look-up table. Another distinct advantage of the inclinometer is that due to the look-up table it can easily accommodate sensors with nonlinear responses as long as the responses are continuous and repeatable.

Figure 13A:
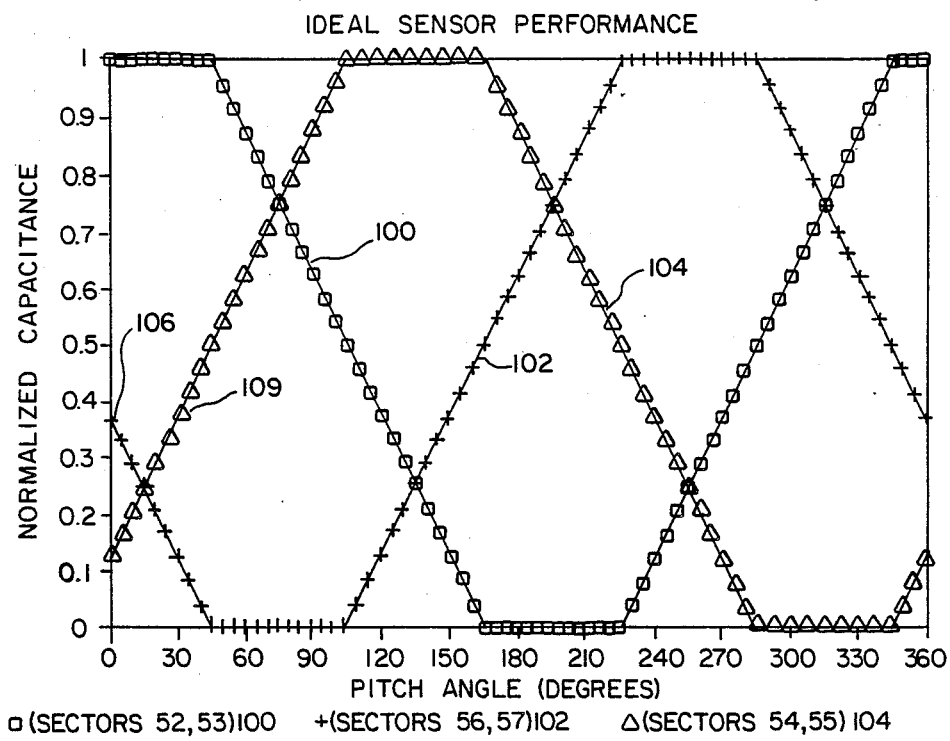
FIG. 13A and 13B show ideal and actual sensor performance.
Figure 13B:
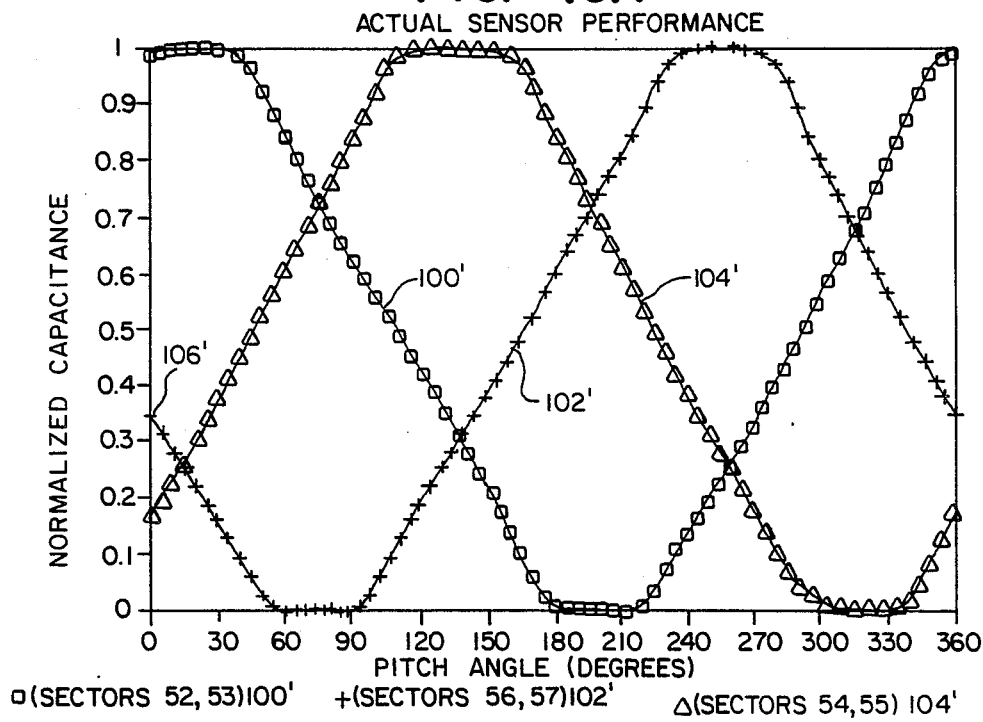
Figure 14:
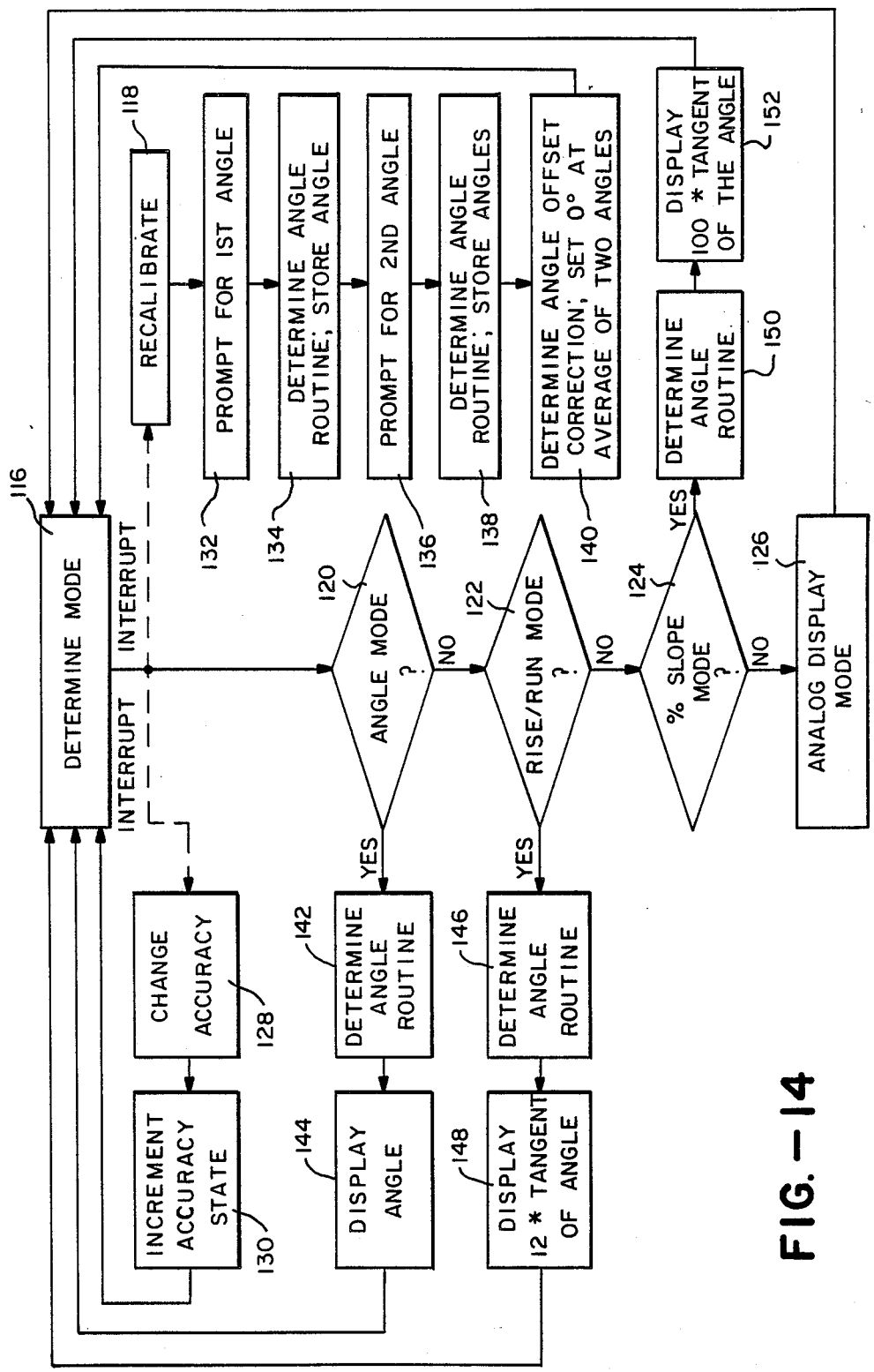
FIG. 14 is a block diagram and schematical flowchart of the methodology and structure for selecting the various modes of an embodiment of the invention.

As depicted in FIGS. 13A and 13B, the performance of the actual sensors vary from that of any ideal sensor. This difference is due to the variation in, for example, dielectric thickness, alignment of the sensor plates, chemical impurities in the fluid conductor, irregularities in the plates, volumetric variations of fluid and surface imperfections in the coatings.

In FIGS. 13A and 13B lines 100, 102 and 104 correspond respectively to sector pair 52, 53, sector pair 56, 57 and sector pair 54, 55. That is to say, for example, that the capacitance value between sector 52 and ground and sector 53 and ground are summed to produce line 100. Thus, correlating FIGS. 6A through 6C, with FIG. 13A and 13B, it can be seen that at point 106, line 100 is fully saturated giving the highest capacitance reading, line 104 represents the lowest capacitance reading as the sector pair 54, 55 has the least fluid positioned therebetween, and line 102 gives the middle capacitance reading which is the reading used for determining the actual angle as will be discussed hereinbelow. Corresponding curves in FIG. 13B are numbered with corresponding prime numbers.

As another example of how an angle is determined it is to be assumed that the inclinometer is pitched to an angle of 30 degrees. It is also to be assumed that the readings has been normalized and temperature compensated so as to behave like the ideal graphs of FIG. 13A. Thus, selecting point 109, it is determined from FIG. 13A that sector pair 52, 53, line 100, has a normalized capacitance of 1.0, sector pair 56, 57 line 102, has a normalized capacitance of 0.125, and sector pair 54, 55, line 104 has a capacitance of 0.375. For simplicity sector pair 52, 53, sector pair 56, 57, and sector pair 54, 55 shall be referred to as pair 1, 2, and 3 respectively. Thus the ordering of the pair from the highest to the lowest capacitance value would be 1, 3, 2. This order uniquely identifies the sextant in which the inclinometer resides. The sextant is one of six 60 degree ranges of pitch. The six non-overlapping sextants can be arranged in the combinations of: 123, 132, 213, 231, 312, and 321. In the 360 degrees of possible pitch angle the sextant of our example is the range from 15 degrees to 75 degrees. It has been found empirically that the most linear readings occur when a sector pairs reading is between that of the other two pairs. A sector pair is associated with two given sextants, and that sector pair is used to determine the angle. Using this criterion, sector pair 54, 55, line 104, is the optimal pair for readings in this example. The microprocessor would use the sextant value (in this case pair 1, highest value, or pair 2, lowest value) to determine which one of six curves in the look-up tables to use. It would then use the pair 3 reading (capacitance =0.375) to find the angle in the look-up table, if necessary. It is to be understood that as line 102 is relatively close to line 104 at this angle value, line 104 could also be used to determine the angle with the appropriate algorithm. Further as previously indicated when the lines 100, 102, and 104, cross the value of either line at the crossing point can be used to determine the angle.

FIG. 12 depicts another preferred embodiment of the circuitry of the inclinometer 20 with component similar to the circuitry of FIG. 11 having corresponding primed numbers. In FIG. 12 the oscillator circuitry 110 includes an analog multiplexing switch 112 which allows the various signals from the capcitor elements to be selectively switched into an oscillator circuit 114 and therefrom directed to the microprocessor 90' in much the same manner as found in the circuitry of FIG. 11. One great advantage of the circuitry of FIG. 11 and 12 is that there is a interface between the microprocessor 90 and the sensor unit 40, which does not include an analog to digital converter.

The block diagram of FIGS. 14 through 17 further describe the invention. In block diagram FIG. 14, block 116 determines the mode by the appropriate selection from mode switch 28. The selections are offered by blocks 120 through 126 and include an angle mode, rise/run mode, percent slope mode and analog display mode respectively. Prior to selecting any of the modes, the user can determine the accuracy range by using button 30. Button 30 is associated with blocks 128 and 130. In the preferred embodiment there are a number of accuracy ranges which are determined by the number of places past the decimal point at which the measurements of the period are adjusted by rounding off, truncating and the like.

The recalibration mode is exemplified by blocks 132 to 140 (means for recalibration). It is to be understood that this recalibration can be accomplished in the field at any time by inclinometer 20 through the use of microprossor 90, the sensor 40 and the look-up table in PROM 96 and the recalibration unit 91. Blocks 132 to 140 represent the structure of recalibration unit 91. Reasons for recalibrating the inclinometer would be that the electrical measurement unit 24 has been inserted into a different rail with different alignment tolerances and thus the sensor would be slightly offset from an ideal position. This offset can be activity accommodated by the recalibration mode. In the recalibration mode, block 132 indicates that the inclinometer is first positioned on a surface and the recalibration button is pressed. This stores the value of this first angle as determined by the determine angle routine of block 134 (storage means). The determine angle routine is more fully described below with respect to FIG. 15. Then the inclinometer is rotated 180 degrees and placed back on the same surface. A second angle measurement is taken and determined as indicated for blocks 136 and 138 (storage means) and the value stored by touching the recalibration button. The two storaged angles are averaged together averaging means of block 140. In an ideal situation, the average would be zero. Any value greater than or less than zero is used as the offset correction factor (combining means of block 140) in all the other readings from the inclinometer until the inclinometer is again recalibrated.

The angle mode is determined with blocks 142 and 144. Block 142 is the determine angle routine as exemplified by the block diagram of FIG. 15 and block 144 is the display angle block. The rise/run mode 122 is determined by first using the determine angle routine of block 146 and the display routine of block 148. The display function is calculated at twelve times the tangent of the angle determined by block 146. This gives the rise to run value of inches per foot.

The percent slope determination is made at block 124 through blocks 150 and 152. In block 150 the determine angle routine is accomplished and in block 152 the displayed value is the value of the tangent of the angle times 100 to give a percent slope display.

Finally, the analog display as described hereinabove can be selected at block 126. The analog display has predetermined set points whereby above a certain inclination, one line to the right or left of the center line (two dots) is indicated. Above a yet higher value, two lines to the right or left of the center point is indicated. Still above a third higher value, three lines to the right or left of the center line of the display is indicated.

A key pad 33 is included to allow the user to modify and refine the output provided by blocks 120, 122 and 124. Additionally other outputs can be programmed with key pad 33.

Figure 15:
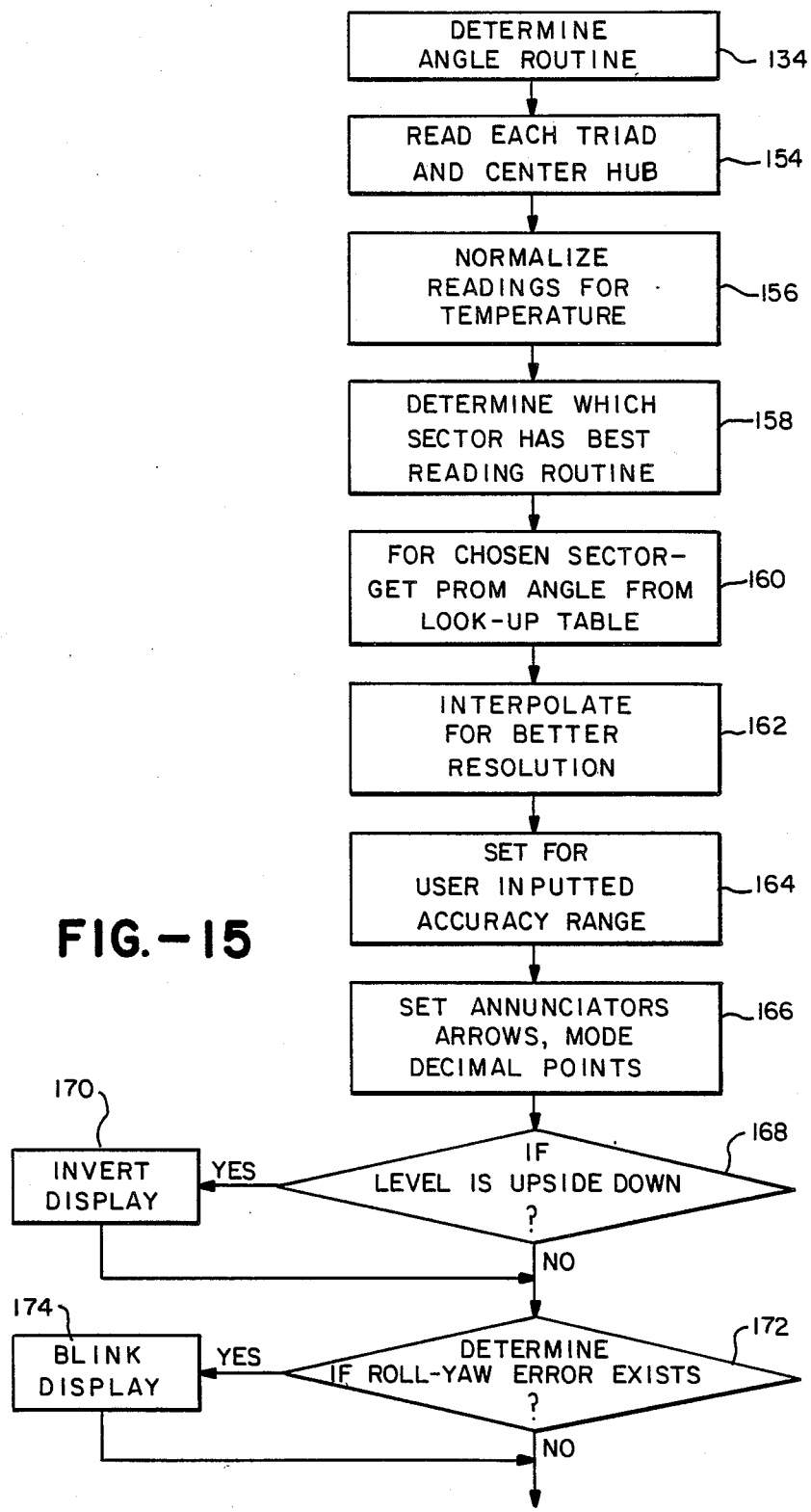
FIG. 15 is a block diagram and schematical flowchart of the methodology and structure for determining an angle.

Viewing FIG. 15, the determine angle routine is presented through blocks 154 to 174. At block 154 each of the sector pairs, and hub pair is read as previously discussed. The readings are normalized for temperature at block 156 as will be discussed hereinbelow and then the best sector for measuring the angle is determined at block 158. As previously discussed with respect to points 106, 106' and 109 and as discussed with respect to FIG. 16 the values from the sector pairs are placed in ascending order, the highest and the lowest capacitance values are excluded and the remaining sector pair is used to determine the angle because it gives the most accurate reading. Again at a cross over point where two of these capacitance values are the same, either of the two same values can be selected to determine the angle. At block 160 the angle is determined from the look-up table in the PROM. The value, if not exact, is interpolated between two close values in the look-up table and the value is rounded according to the accuracy setting in block 164. Then a determination is made as to how to energize the display at block 166 to provide the appropriate readings. At block 168, if the angle reading indicates the inclinometer is upside down, the logic of the inclinometer, as implemented in microprocessor 90 and display indicator 24, automatically inverts the display at block 170. At block 172, if the roll and/or yaw is outside of acceptable limits, the display blinks indicating to the user that the inclinometer should be repositioned.

Figure 16:
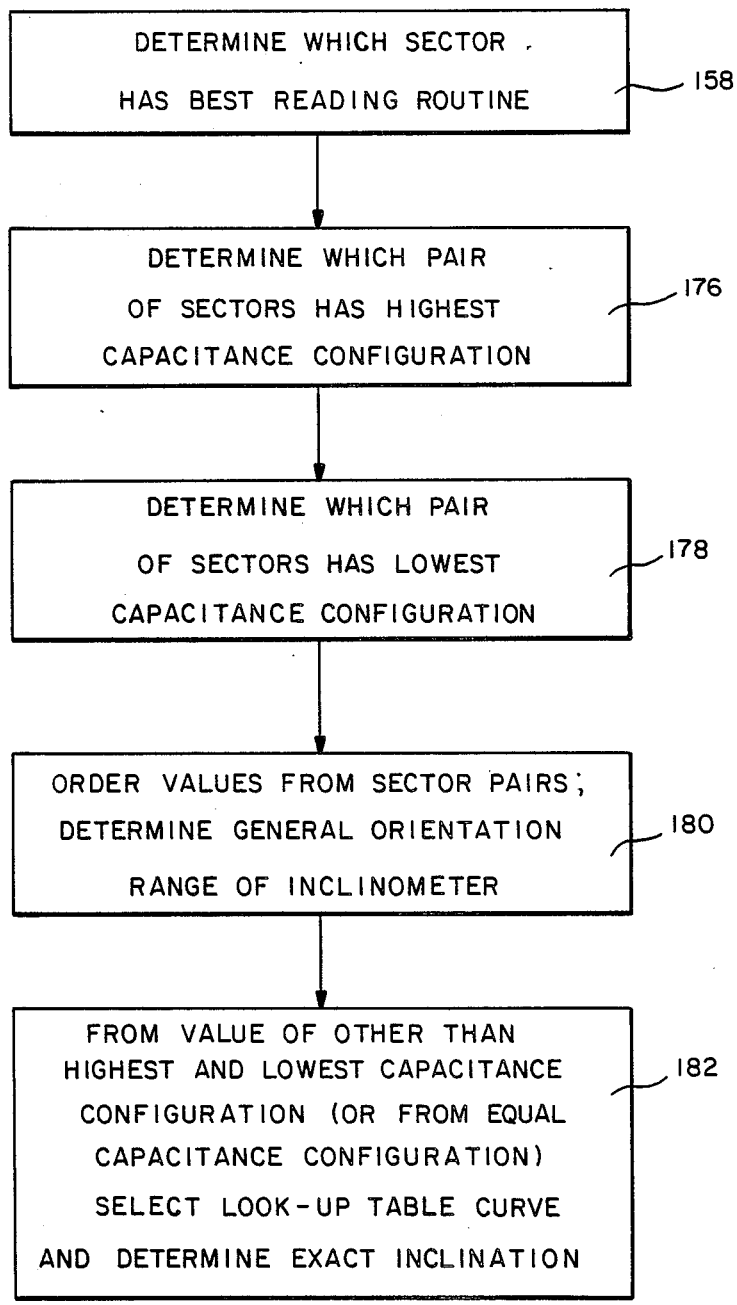
FIG. 16 is a block diagram and schematical flowchart depicting the methodology and structure for determining which sector has the best reading.

In FIG. 16, block 176 through 182 determine which sector has the best reading. This is accomplished by determining, with the microprocessor 90 and associated circuitry of inclinometer 20 (ordering means), the sector pair that has the highest capacitance (most often saturation) at block 176 and the sector pair that has the lowest capacitance at block 178. The pairs are ordered and the general orientation of the inclinometer, as previously discussed, is determined at block 180. At block 182 the sector pair which have other than the highest and lowest capacitance configuration is determined. From the value of this pair the angle is determined from the selected look-up table curve as represented in block 160. This determination allows the inclinometer to select one of the several performance curves (FIG. 13B) stored in the look-up table.

Figure 17:
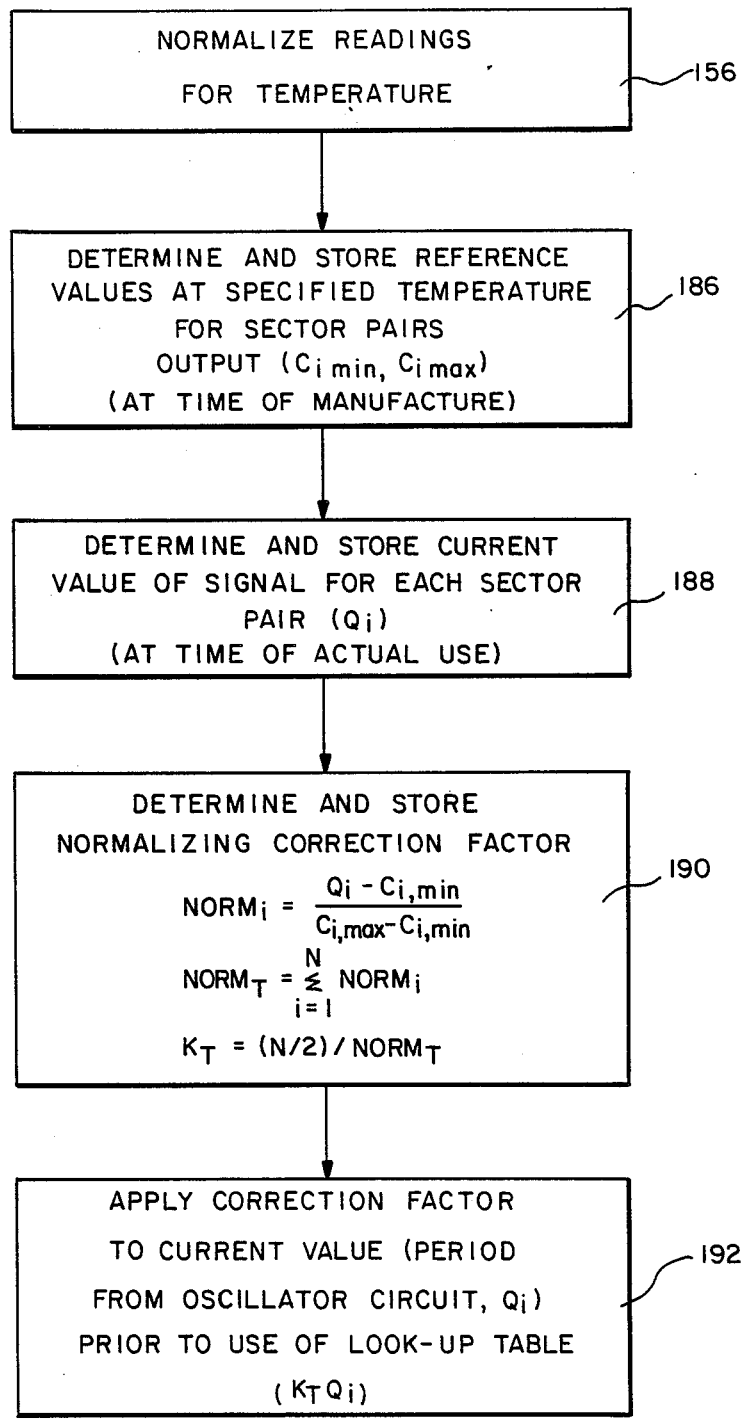
FIG. 17 is a block diagram and schematical flowchart of the methodology and structure for providing for temperature compensation.

In FIG. 17, the block diagram describe the structure used to nomalized the temperature. This normalization is accomplished by blocks 186 through 192 and temperature compensation unit 93 which implements the structural element of blocks 186 to 192.

The normalization of the temperature is accomplished beginning at block 186 where reference values have been storaged, as previously determined at a specific temperature during manufacture. For temperature normalization, Q= field measured value for each sector pair and C= the stored calibration table value of each sector as determined during manufacture. Each of these values Q and C is the sum of the capacitance values between adjacent sectors and the ground provided by the edge 46. The reference values stored in the look-up table are $C_i$, min, and $C_i$, max.

For each pair has a normalization value that is determined according to the formula:

$$\text{Norm} = (Q_i - C_i, \min)/C_i, \max - C_i, \min).$$

The normalization factor for the total of N sectors is:

$$\text{Norm}_T = (\text{Norm}_1 + \text{Norm}_2 + \text{Norm}_3 + \ldots + \text{Norm}_N).$$

The $Q_i$ values are determined in block 188. The temperature correction factor as the determined block 190 is:

$$K_T = (N/2)\text{Norm}_T.$$

In block 192 this temperature correction value is multiplied by the reading from the selected sector pair to compute the value to be used in the look-up table to determine the angle of inclination. In the present example with three sector pairs, N=3.

An alternate angle determination routine includes a least squares fit between the three measured angles and their values determined during calibration. This would require minimizing the sum of the squares of the difference between each of the measured angles and the calibrated values as a function of angle.

Angle theta = the angle to be determined $$[(Q_1 - C_1(\text{theta}))^2 + (Q_2 - C_2(\text{theta}))^2 + (Q_3 - C_3(\text{theta}))^2]$$

where $Q$ = measured values $C(\text{theta})$ = calibrated values as a function of angle (either as an expression or in tabular form)

Analytically this minimization can be accomplished by differentiating the function with respect to theta and setting the result equal to zero. The theta that solves this equation is the desired theta.

If the data is in the tabular form a search is performed starting with the assumption that:

$C_1(\text{theta}) = Q_1$ which would give a theta which would then give $C_2$ (theta) and $C_3$ (theta) allowing the calculation:

$$[(Q_1 - C_1(\text{theta}))^2 + (Q_2 - C_2(\text{theta}))^2 + (Q_3 - C_3(\text{theta}))^2]$$

Figure 18:
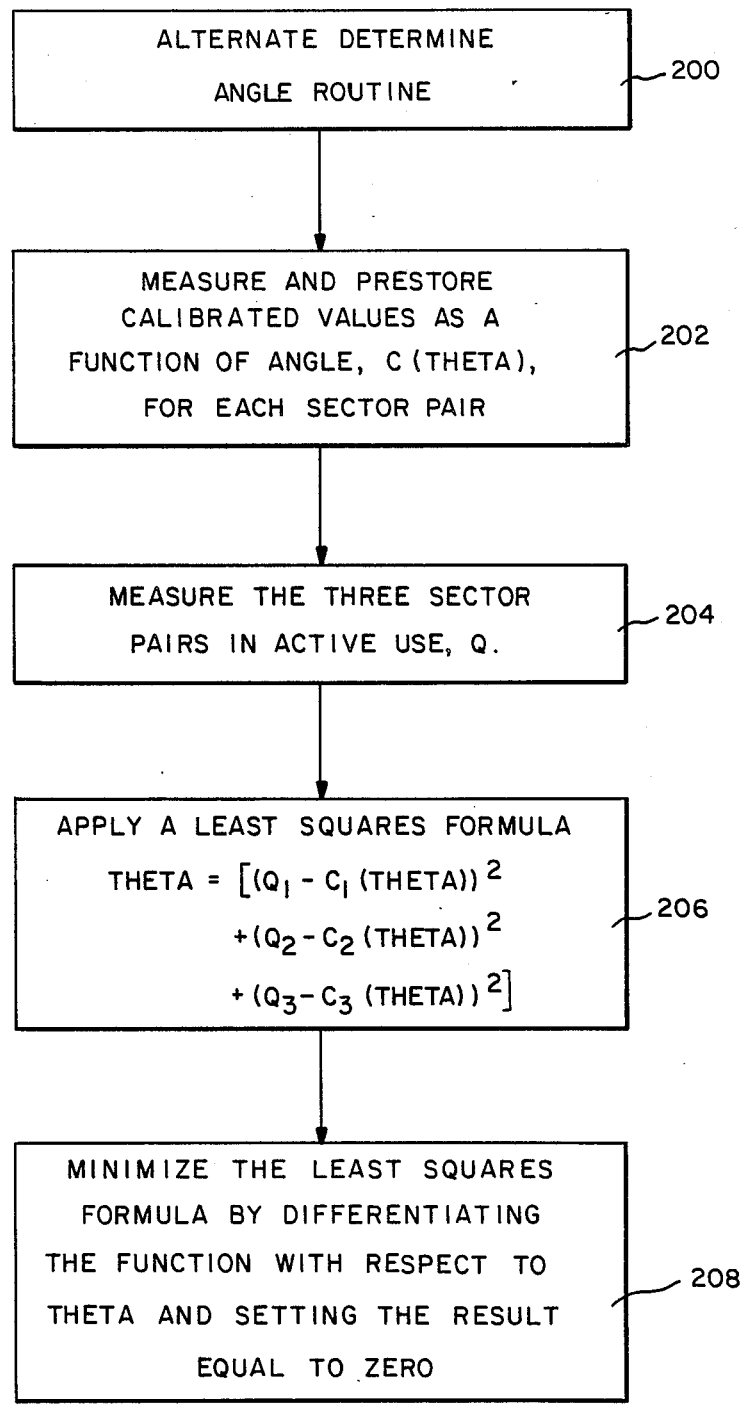
FIG. 18 is a block diagram and schematical flow chart of an alternate methodology and structure for determining an angle.

This expression is then iteratively evaluated at theta+ delta where delta is a prefined small angle. Depending on the effect of delta, delta is modified to result in the minimization of $[(Q_1-C_1(theta))^2+(Q_2-C_2(theta))^2-(Q_3-C_3(theta))^2]$ to within an acceptable range zero. This is accomplished by block 200 to 208 of FIG. 18.

An alternative sensor can use variable resistors 210, 212, 214 (FIG. 11) in addition to a variable capacitor (recapacitor). Additionally a variable resistor can be used instead of a variable capacitor.

A sensor with a variable resistor and variable capacitor is similar to the embodiments described with respect to FIG. 11 and 12, but would not require the dielectric coating on the plates. The fairly low conductance of the fluid allows the fluid to be conceptualized as a capacitor with resistors in parallel and series with it. The oscillator circuit still functions, but in a less linear way, because now, not only is the capacitance of the sensor a function of the wetted area of a given sensor plate, but also the fluid resistance is a function of the wetted area.

Figure 19:
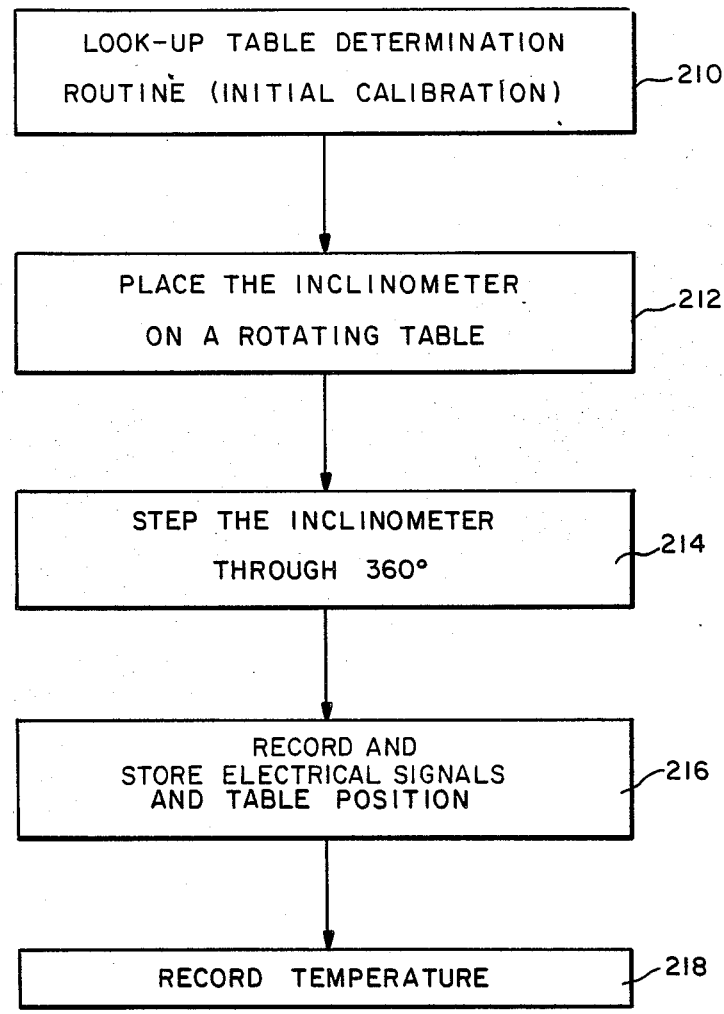
FIG. 19 is a block diagram and schematical flow chart of a methodology and structure for a look-up table determination.
Figure 20:
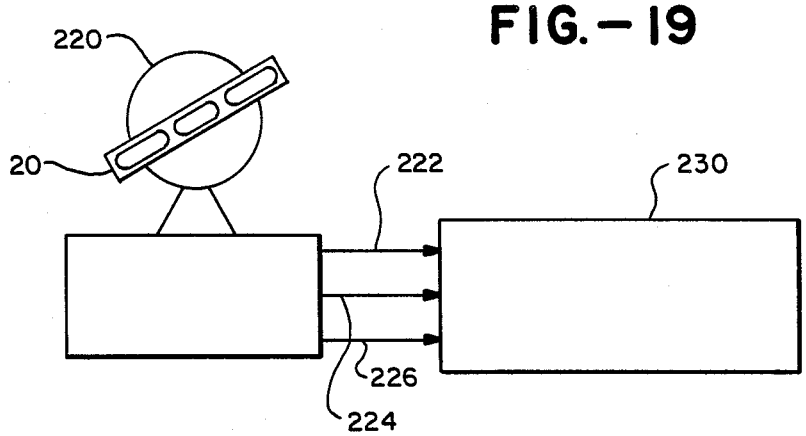
FIG. 20 is a look-up table determination structure.

A method and structure for determining the look-up table is presented in FIGS. 19 and 20. In FIG. 19 the look-up table routine is presented in blocks 210 through 218. In block 212, the inclinometer 20 is placed on a rotating table such as rotating table 220 in FIG. 20. The table is then stepped through 360° as presented in block 214. The position of the rotating table and the electrical signal indicating the anle of the inclinometer are recorded at blocks 216 in FIG. 19 and communicated by lines 222, 224 and 226 to storage unit 230 (block 216) in FIG. 20. This information can then be provided to a memory device such as the PROM 96 in FIG. 11.

INDUSTRIAL APPLICABILITY

The inclinometer 20 of the invention is used in the following manner. First an appropriately sized rail, whether 2, 4, 6 or 12 feet long, or if another length, is selected. Then the electrical measuring unit 26 is inserted into the rail. The unit is calibrated using the recalibration routine of block 118. Then the range accuracy is selected at selector 30 and the mode selector 28 is used to determine which mode is to be read out. The inclinometer is set in a desired location and an appropriate reading is determined.

From the above, it can be seen that the present inclinometer 20 has significant advantages with respect to ease of construction, ease of use, accuracy and reliability. In addition to the advantages, aspects and objects of the invention as described hereinabove and, in particular, in the summary of the invention, other objects, aspects, and advantages of the invention can be obtained through review of the claims and the figures appended hereto. It is to be understood that althrough selected embodiments are presented herein, a multitude of other embodiments are possible and within the scope of the invention as claimed. As for example, non-capacitive type sensors or sensors using capacitive as well as other devices can be used and fall within the scope of the invention.

We claim:

1. An inclinometer comprising:
   a sensor means for providing varying capacitance depending on the orientation of the inclinometer;
   a circuit means connected to said sensor means for providing a signal having a period and a frequency dependant on the capacitance of the sensor means;
   means for determining at least one of the period and the frequency of the signal;
   look-up table means for storing a relationship between a table value including at least one of the period and the frequency of the signal and the orientation of the inclinometer;
   means for comparing at least one of the period and the frequency of the signal to the table value of the relationship stored in the look-up table means and for selecting a corresponding orientation;
   means for displaying the results of the comparing means; and
   wherein the sensor means includes:
   (a) first plate having a plurality of isolated, conducting first sectors which first sectors are clustered about a conducting central first hub;
   (b) a first thin dielectric layer covering said first sectors and said second hub;
   (c) a second plate having a plurality of isolated, conducting second sectors which second sectors are clustered about a conducting central second hub;
   (d) a second thin dielectric layer covering said second sectors and said second hub;
   (e) said first plate positioned adjacent to said second plate with the first dielectric layer facing the second dielectric layer;
   (f) conducting peripheral edge means for defining a cavity between said first and second plates; and
   (g) a conducting fluid partially filling said cavity such that the fluid is positioned between at least one of the first sectors and at least one of the second sectors.

2. The apparatus of claim 1 wherein the circuit means includes means for providing a signal dependant on the capacitance value of selected and adjacent pairs of said first and second sectors.

3. The apparatus of claim 2 wherein said circuit means includes an analog switch which can select between each of said first and second sectors for providing a signal from any selected sector.

4. The apparatus of claim 1 wherein said first plate has an odd number of first sectors and said second plate has an odd number of second sectors.

5. The apparatus of claim 1 wherein said means for displaying the results include means for providing one and more repeating indicators to the left and right of a center line depending on the degree to which the inclinometer is inclined to the right and to the left.

6. The apparatus of claim 1 including:
   means for compensating for a change in temperature.

7. The apparatus of claim 6 wherein said temperature compensation means includes:
   means for storing a reference value for the sensor means;
   means for determining a correction factor and applying said correction factor to a value determined by the means for determining at least one of the period and the frequency for the signal.

8. The apparatus of claim 1 which said means for displaying the results can invert the display dependent on the apparatus orientation.

9. The apparatus of claim 1 wherein the first plate is parallel to the second plate.

10. An inclinometer comprising:
    a sensor means for providing varying capacitance depending on the orientation of the inclinometer;
    a circuit means connected to said sensor means for providing a signal having a period and a frequency dependant on the capacitance of the sensor means;

means for determining at least one of the period and the frequency of the signal;

look-up table means for storing a relationship between a table value including at least one of the period and the frequency of the signal and the orientation of the inclinometer;

means for comparing at least one of the period and the frequency of the signal to the table value of the relationship stored in the look-up table means and for selecting a corresponding orientation;

means for displaying the results of the comparing means; and means for recalibrating having:
(a) means for storing a first representation of an orientation with the inclinometer in a first position;
(b) means for storing a second representation of an orientation with the inclinometer in a second position which is rotated 180° from the first position;
(c) means for averaging the first and second representation to determine an offset correction factor; and
(d) means for combining the offset correction factor with further signals representative of the orientation of the inclinometer.

11. An inclinometer comprising:
a sensor means for providing varying capacitance depending on the orientation of the inclinometer;
a circuit means connected to said sensor means for providing a signal having a period and a frequency dependant on the capacitance of the sensor means;
means for determining at least one of the period and the frequency of the signal;
look-up table means for storing a relationship between a table value including at least one of the period and the frequency of the signal and the orientation of the inclinometer;
means for comparing at least one of the period and the frequency of the signal to the table value of the relationship stored in the look-up table means and for selecting a corresponding orientation;
means for displaying the results of the comparing means; and
means for recalibrating having:
(a) means for storing a first representation of orientation with the inclinometer in a first position;
(b) means for storing a second representation of orientation with the inclinometer in a second position which is rotated 180° from the first position;
(c) means for setting the average of the first representation and the second representation to a zero reference signal value.

12. An inclinometer comprising:
a sensor means for providing varying capacitance depending on the orientation of the inclinometer;
a circuit means connected to said sensor means for providing a signal having a period and a frequency dependant on the capacitance of the sensor means;
means for determining at least one of the period and the frequency of the signal;
look-up table means for storing a relationship between a table value including at least one of the period and the frequency of the signal and the orientation of the inclinometer;
means for comparing at least one of the period and the frequency of the signal to the table value of the relationship stored in the look-up table means and for selecting a corresponding orientation;
means for displaying the results of the comparing means; and wherein the sensor means includes:
(a) a first plate having a plurality of isolated, conducting first sectors, which first sectors have an inner curved border defining a first center, generally circular, area;
(b) a first thin dielectric layer covering said first sectors and said first center area;
(c) a second plate having a plurality of isolated, conducting second sectors, which second sectors have an inner curved border defining a second central, generally circular area;
(d) a second thin dielectric layer covering said second sectors and said second center area;
(e) said first plate positioned substantially parallel to said second plate with the first dielectric layer facing the second dielectric layer;
(f) conducting peripheral edge means for defining a cavity between said first and second plates; and
a conducting fluid partially filling said cavity such that the fluid is positioned between at least one of the first sectors and at least one of the second sectors.

13. An inclinometer comprising:
a sensor means for providing varying capacitance depending on the orientation of the inclinometer;
a circuit means connected to said sensor means for providing a signal having a period and a frequency dependant on the capacitance of the sensor means;
means for determining at least one of the period and the frequency of the signal;
look-up table means for storing a relationship between a table value including at least one of the period and the frequency of the signal and the orientation of the inclinometer;
means for comparing at least one of the period and the frequency of the signal to the table value of the relationship stored in the look-up table means and for selecting a corresponding orientation;
means for displaying the results of the comparing means; and
wherein the sensor means includes:
(a) a first plate having a plurality of isolated, conducting first sectors which first sectors are clustered about an isolated, conducting central first hub;
(b) a second plate having a plurality of isolate, conducting second sectors which second sectors are clustered about an isolated, conducting central second hub;
(c) said first plate positioned adjacent to said second plate;
(d) conducting peripheral edge means for defining a cavity between said first and second plates; and
(e) a fluid partially filling said cavity such that for all orientations of the sensors there is a fluid positioned between said first and second hubs; and
wherein the circuit means includes means for providing a signal dependant on the capacitance between said edge means and at least one of said first and second sectors; and
said circuit means for providing a signal dependant on the capacitance between said edge means and at least one of said first hub and said second hub to determine at least one of the roll orientation and the yaw orientation of the inclinometer, where the pitch orientation is the orientation to be determined by the look-up table.

14. The apparatus of claim 13 including:

means for indicating when at least one of the roll and the yaw orientation of the inclinometer is greater than a preset limit.

15. The apparatus of claim 13 which said means for displaying the results can invert the display dependent on the orientation of the apparatus.

16. The apparatus of claim 13 including:
means for warning when the roll orientation of the inclinometer is greater than a preset limitation, said limitation is defined as follows:
with:
r = the radius of the first and the second hubs
t = the thickness of the sensor means phi = the roll angle
phi is such that:
r > ½ tan(phi)

17. The apparatus of claim 13 wherein said means for displaying the results can invert the display of an orientation value of the inclinometer dependant on which of the sectors has the highest and the lowest capacitance.

18. The apparatus of claim 13 including: means for warning when at least one of the roll and the yaw orientation of the inclinometer is greater than a preset limit.

19. An inclinometer comprising:
a sensor means for providing varying capacitance values depending on the orientation of the inclinometer;
a circuit means connected to said sensor means for providing signals having a period and a frequency dependant on the capacitance values of the sensor means;
means for determining at least one of the period and the frequency of the signals;
look-up table means for storing a relationship between a table value including at least one of the period and the frequency of the signals and the orientation of the inclinometer;
means for comparing at least one of the period and the frequency of the signals to the table values of the relationship stored in the look-up table means and for selecting a corresponding orientation;
means for displaying the results of the comparing means; and
wherein the sensor means includes:
(a) a first plate having a plurality of isolate, conducting first sectors;
(b) a second plate having a plurality of isolate, conducting second sectors;
(c) said first plate positioned adjacent to said second plate;
(d) conducting peripheral edge means for defining a cavity between said first and second plates;
(e) a conducting fluid partially filling said cavity; and
wherein said signals represent capacitive values between each of said first sectors and the conducting peripheral edge means and capacitive values between each of said second sectors and the conducting peripheral edge means; and
wherein said means for determining at least one of the period and the frequency of the signals includes means for ordering said signals from at least one of said first sectors of said first plate and said second sectors of said second plate between signals representing a highest capacitance configuration to a lowest capacitance configuration.

20. The apparatus of claim 19 including:
said ordering means for selecting and using the highest and the lowest capacitance configuration for determining a range of orientation for the inclinometer and for selecting a middle capacitance configuration to determine the orientation of the inclinometer within said range.

21. The apparatus of claim 20 wherein the middle capacitance configuration can be equal to at least one of the highest capacitance configuration and to the lowest capacitance configuration.

22. An inclinometer comprising:
a sensor means for providing varying capacitance depending on the orientation of the inclinometer;
a circuit means connected to said sensor means for providing a signal having a period and a frequency dependant on the capacitance of the sensor means;
means for determining at least one of the period and the frequency of the signal;
look-up table means for storing a relationship between table values including at least one of the period and the frequency of the signal and the orientation of the inclinometer;
means for comparing at least one of the period and the frequency of the signal to the table values of the relationship stored in the look-up table means and for selecting a corresponding orientation;
means for displaying the results of the comparing means; and
wherein the sensor means includes:
(a) a first plate having a plurality of isolated, conducting first sectors;
(b) a second plate having a plurality of isolated, conducting second sectors;
(c) said first plate positioned adjacent to said second plate with pairs of sectors provided with the first sectors paired with the second plates;
(d) a conducing peripheral edge means for defining a cavity between said first and second plates; and
(e) a conducting fluid partially filling said cavity such that all orientation of the sensors there is fluid positioned between at least one of said first sectors and at least one of said second sectors; and
a means for compensating for a change in temperature having:
(a) means for storing reference values which are minimum and maximum outputs of the determining means for each pair of sectors of the first and second plates at a preselected temperature;
(b) means for combining the reference values with the current values for each pair of sectors to obtain a normalization value where:
$Q_i$ = the current stored calibration value for each pair
$C_i$, min = the minimum stored calibration value for each pair
$C_i$, max = the maximum stored calibration value for each pair
then:

$$\text{Normalization Factor} = \text{Norm}_i = \frac{Q_i - C_{i,\ min}}{C_{i,\ max} - C_{i,\ min}}$$

And:

$$\text{Total Normalization Factor } N_T = \sum_{i=1}^{N} \text{Norm } i$$

Where $N$ = Total number of pairs

And:

-continued $$\text{Correction factor} = K_T = \frac{N/2}{N_T}$$

and, the compensated value to be compared with the look-up table is $K_T Q_i$.

23. A method for recalibrating an inclinometer, the method comprising:
 generating a first electrical signal having a first signal property which represents a first position of the inclinometer;
 storing said first signal property;
 rotating the inclinometer 180° to a second position;
 generating a second electrical signal having a second signal property which represents the second position;
 storing said second signal property;
 setting the average of the first signal property and the second signal property to a reference signal value.

24. The method of claim 23 including initial calibration steps of:
 placing the inclinometer upon a rotating table;
 stepping the table through substantially 360°;
 simultaneously storing a plurality of electrical signals and the position of the table.

25. The method of claim 24 wherein the initial calibration step includes the step of simultaneously recording the temperature.

26. The method of claim 23 including:
 providing a user definable display mode.

27. The method of claim 23 including:
 providing for temperature compensating of the inclinometer.

28. The method of claim 23 including:
 adjusting the accuracy of the inclinometer.

29. A method for temperature compensating the determining of inclinations with an inclinometer, the method comprising the steps of:
 generating an electrical signal having at least one signal property which varies with respect to the inclination of the inclinometer;
 identifying and storing said signal property;
 storing reference temperature values;
 determining a correction factor based on the reference temperature values, and the signal property;
 applying said correction factor to the signal property;
 converting said signal property into an inclination value;
 displaying said inclination value.

30. A method for determining and indicating inclinations with an inclinometer, the method comprising the steps of:
 generating an electrical signal having a signal property which varies with respect to the inclination of the inclinometer;
 identifying and storing said signal property;
 converting said signal property into an inclination value;
 displaying said inclination value; and
 providing temperature compensation by:
 (a) measuring and storing a signal property at a calibration temperature,
 (b) measuring and storing a signal property at an actual temperature;
 (c) normalizing the signal property at the actual temperature based on the signal property at the calibration temperature.

31. A method for determining and indicating inclinations with an inclinometer comprising:
 generating an electrical signal having a signal property which varies with respect to the inclination of the inclinometer;
 identifying and storing said signal property;
 converting said signal property into an inclination value, wherein said converting step includes applying at least squares formula between measured angle values and calibrated angle values;
 displaying said inclination value.

32. The method of claim 31 wherein said converting step includes:
 with $C_i(theta)$ = calibrated angle value;
 $Q_i$ = measured angle values;
 and the least squares formula = $[(Q_1-C_1(theta))^2 + (Q_2-C_2(theta))^2 (Q_3-C_3(theta))^2 + \ldots + (Q_N-C_N(theta))^2]$
 then differentiating the least squares formula;
 setting the result equal to zero;
 determining theta.

33. A capacitive sensor including:
 a first plate having a plurality of isolated conducting first sectors, which first sectors are clustered about an isolated, conducting central first hub;
 a first thin dielectric layer covering said first plate and said first sectors and said first hub;
 a second plate having a plurality of isolated, conducting second sectors, which second sectors are clustered about an isolated, conducting central second hub;
 a second thin dielectric layer covering said second plate and said second sections and said second hub;
 said first plate positioned substantially parallel to said second plate and the first dielectric layer facing said second dielectric layer;
 conducting peripheral edge means for defining a cavity between said first and second dielectric layers of said first and second plates;
 a conducting fluid partially filling said cavity and in contact with said conducting peripheral edge means such that the fluid is positioned adjacent at least one of the first and second sectors; and
 connecting means for selectivety associating selected first and second sectors and hubs with the conducting peripheral edge means such that capacitive values can be determined between said conducting peripheral edge means and said first and second sectors and hubs in order to facilitate a determination of an orientation of the capacitive sectors.

34. The capacitive sensor of claim 33 wherein said first plate includes an odd number of substantially identically wedge shaped first sectors, the outer edge of which defines a first circle, clustered about the first hub which is substantially circular;
 said second plate includes an odd number of substantially identically wedge shaped second sectors, the outer edges of which define a second circle, clustered about the second hub which is substantially circular;
 which first sectors are aligned with respect to said second sectors; and
 which first hub is aligned with respect to said second hub.

35. The capacitive sensor of claim 33 wherein said conducting fluid is electrically grounded.

36. The capacitive sensor of claim 33 wherein said conducting fluid fills said cavity such that substantially half of each of said first and second plates are covered by the fluid.

37. The capacitive sensor of claim 33 including an odd number of first sectors and an odd number of second sectors.

38. The capacitive sensor of claim 33 wherein each of said first sectors have borders which face borders of adjacent first sectors and which are nonlinear, and each of said second sectors have borders which face borders of adjacent second sectors and which are nonlinear.

39. The capacitive sensor of claim 33 wherein said first and second hubs are circular and aligned with each other.

40. A capacitive sensor including:
a first plate having a plurality of isolated conducting first sectors, which first sectors have an inner curved border defining a first central, generally circular area;
a first thin dielectric layer covering said first plate and said first sectors;
a second plate having a plurality of isolated, conducting second sectors, which second sectors have an inner curved border defining a second central, generally circular, area;
a second thin dielectric layer covering said second plate and said second sectors;
said first plate positioned substantially parallel to said second plate with the first dielectric layer facing said second dielectric layer;
conducting peripheral edge means for defining a cavity between said first and second dielectric layers of said first and second plates;
a conducting fluid partially filling said cavity and in contact with said conducting peripheral edge means such that the fluid is positioned adjacent at least one of the first and second sectors; and
connecting means for selectively associating selected first and second sectors and hubs with the conducting peripheral edge means such that the capacitive values can be determined between said conducting peripheral edge means and said first and second sectors and hubs in order to facilitate a determination of an orientation of the capacitive sensor.

41. A capacitive sensor including:
a plate having a plurality of isolated conducting sectors;
a thin dielectric layer covering said plate and said sectors;
means for conducting positioned adjacent said dielectric layer;
means for defining a cavity in conjunction with said dielectric layer and said conducting means;
a conducting fluid partially filling said cavity such that said conducting fluid can be simultaneously in contact with the conducting means and said dielectric layer; and
connecting means for selectively associating selected sections and said conducting means such that a capacitive value can be determined between said conducting means and selected sectors in order to facilitate a determination of an orientation of the capacitive sensor.

42. The sensor of claim 41 including:
said sections being clustered about a conducting central hub;
said dielectric layer covering said conducting central hub;

said connecting means for selectively associating said hub with the conducting means such that capacitive values can be determined between said conducting means and said hub in order to facilitate a determination of an orientation of the capacitive sensor.

43. A capacitive sensor including:
a first plate having a plurality of isolated conducting first sectors;
a first thin dielectric layer covering said first plate and said first sectors;
a second plate having a plurality of isolated, conducting second sectors;
a second thin dielectric layer covering said second plate and said second sections;
said first plate positioned substantially parallel to said second plate and the first dielectric layer facing said second dielectric layer;
conducting peripheral edge means for defining a cavity between said first and second dielectric layers of said first and second plates;
a conducting fluid partially filling said cavity and in contact with said conducting peripheral edge means such that the fluid is positioned adjacent at least one of the first and second sectors; and
connecting means for selectively associating selected first and second sectors with the conducting peripheral edge means such that capacitive values can be determined between said conducting peripheral edge means and said first and second sectors in order to facilitate a determination of an orientation of the capacitive sectors.

44. An inclinometer comprising:
a sensor means for providing varying capacitance depending on the orientation of the inclinometer;
a circuit means connected to said sensor means for providing a signal dependant on the capacitance of the sensor means;
look-up table means for storing a relationship between a table value including the capacitance of the sensor means and the orientation of the inclinometer;
means for comparing the signal to the table value of the relationship sorted in the look-up table means and for selecting a corresponding orientation;
means for displaying the results of the comparing means; and
means for recalibrating having:
(a) means for storing a first representation of an orientation with the inclinometer in a first position;
(b) means for storing a second representation of an orientation with the inclinometer in a second position which is rotated 180° from the first position;
(c) means for averaging the first and second representation to determine an offset correction factor; and
(d) means for combining the offset correction factor with further signals representative of the orientation of the inclinometer.

45. An inclinometer comprising:
a sensor means for providing varying capacitance depending on the orientation of the inclinometer;
a circuit means connected to said sensor means for providing a signal dependant on the capacitance of the sensor means;
look-up table means for storing a relationship between a table value including the capacitance of the sensor means and the orientation of the inclinometer;

means for comparing the signal to the table value of the relationship stored in the look-up table means and for selecting a corresponding orientation;

means for displaying the results of the comparing means; and means for recalibrating having:
(a) means for storing a first representation of orientation with the inclinometer in a first position;
(b) means for storing a second representation of orientation with the inclinometer in a second position which is rotated 180° from the first position;
(c) means for setting the average of the first representation and the second representation to a zero reference signal value.

46. An inclinometer comprising:
a sensor means for providing varying capacitance depending on the orientation of the inclinometer;
a circuit means connected to said sensor means for providing a signal dependant on the capacitance of the sensor means;
look-up table means for storing a relationship between a table value including the capacitance of the sensor means and the orientation of the inclinometer;
means for comparing the signal to the table value of the relationship stored in the look-up table means and for selecting a corresponding orientation;
means for displaying the results of the comparing means; and
wherein the sensor means includes:
(a) a first plate having a plurality of isolated, conducting first sectors which first sectors are clustered about a conducting central first hub;
(b) a first thin dielectric layer covering said first sectors and said second hub;
(c) a second plate having a plurality of isolated, conducting second sectors which second sectors are clustered about a conducting central second hub;
(d) a second thin dielectric layer covering said second sectors and said second hub;
(e) said first plate positioned adjacent to said second plate with the first dielectric layer facing the second dielectric layer;
(f) conducting peripheral edge means for defining a cavity between said first and second plates; and
(g) conducting fluid partially filling said cavity such that the fluid is positioned between at least one of the first sectors and at least one of the second sectors.

47. An inclinometer comprising:
a sensor means for providing varying capacitance depending on the orientation of the inclinometer;
a circuit means connected to said sensor means for providing a signal dependant on the capacitance of the sensor means;
look-up table means for storing a relationship between a table value including the capacitance of the sensor means and the orientation of the inclinometer;

means for comparing the signal to the table value of the relationship stored in the look-up table means and for selecting a corresponding orientation;
means for displaying the results of the comparing means; and
wherein the sensor means includes:
(a) a first plate having a plurality of isolated, conducting first sectors, which first sectors have an inner curved border defining a first center, generally circular, area;
(b) a first thin dielectric layer covering said first sectors and said first center area;
(c) a second plate having a plurality of isolated, conducting second sectors, which second sectors have an inner curved border defining a second central, generally circular area;
(d) a second thin dielectric layer covering said second sectors and said second center area;
(e) said first plate positioned substantially parallel to said second plate with the first dielectric layer facing the second dielectric layer;
(f) conducting peripheral edge means for defining a cavity between said first and second plates; and
a conducting fluid partially filling said cavity such that the fluid is positioned between at least one of the first sectors and at least one of the second sectors.

48. An inclinometer comprising:
a sensor means for providing varying capacitance depending on the orientation of the inclinometer;
a circuit means connected to said sensor means for providing a signal dependant on the capacitance of the sensor means;
look-up table means for storing a relationship between a table value of the capacitance of the sensor means and the orientation of the inclinometer;
means for comparing the signal to the table value of the relationship stored in the look-up table means and for selecting a corresponding orientation;
means for displaying the results of the comparing means; and
wherein the sensor means includes:
(a) a plate having a plurality of isolated conducting sectors;
(b) a thin dielectric layer covering said plate and said sectors;
(c) means for conducting positioned adjacent said dielectric layer;
(d) means for defining a cavity in conjunction with said dielectric layer and said conducting means;
(e) a conducting fluid partially filling said cavity such that said conducting fluid can be simultaneously in contact with the conducting means and said dielectric layer; and
(f) connecting means for selectively associating selected sections and said conducting means such that a capacitive value can be determined between said conducting means and selected sectors in order to facilitate a determination of an orientation of the inclinometer.

* * * * *